(12) United States Patent
Wu

(10) Patent No.: US 9,190,945 B2
(45) Date of Patent: Nov. 17, 2015

(54) VOLTAGE REGULATOR, UNDER-VOLTAGE PROTECTION CIRCUIT THEREOF AND VOLTAGE REGULATION SYSTEM

(71) Applicants: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

(72) Inventor: Hsin-Hung Wu, Nan-Tou (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

( * ) Notice: Subject to any disclaimer, the term of this patent is extended or adjusted under 35 U.S.C. 154(b) by 45 days.

(21) Appl. No.: 14/202,476

(22) Filed: Mar. 10, 2014

(65) Prior Publication Data

US 2015/0015215 A1    Jan. 15, 2015

(30) Foreign Application Priority Data

Jul. 3, 2013    (TW) .............................. 102123790 A

(51) Int. Cl.
*H02P 9/00* (2006.01)
*H02P 9/10* (2006.01)
(Continued)

(52) U.S. Cl.
CPC ................. *H02P 9/107* (2013.01); *H02H 3/24* (2013.01); *H02H 7/06* (2013.01); *H02P 9/006* (2013.01); *H02P 9/30* (2013.01)

(58) Field of Classification Search
CPC ........... H02P 9/30; H02P 9/107; H02P 9/006; H02H 7/06; H02H 3/24; F03D 5/02
USPC ............................... 322/24, 28, 44, 89, 59, 77
See application file for complete search history.

(56) References Cited

U.S. PATENT DOCUMENTS 4,239,978 A * 12/1980 Kofink ............................ 307/16
4,349,854 A *  9/1982 Mori et al. ....................... 361/21
(Continued)

FOREIGN PATENT DOCUMENTS

CN             201656439 U    11/2010
CN             102636685 A     8/2012
(Continued)

*Primary Examiner* — Julio Cesar Gonzalez
(74) *Attorney, Agent, or Firm* — Li & Cai Intellectual Property (USA) Office

(57) ABSTRACT

A voltage regulator coupled between a batteryless alternator and a ground includes an under-voltage detection circuit and an exciting current regulating unit. The under-voltage protection circuit includes a voltage detection unit, a plurality of switching circuits, and a power switch. The voltage detection unit generates a first control signal according to an output voltage of the batteryless alternator. The switching circuits are connected in series and controlled by the first control signal. The power switch is coupled to one of the switching circuits and a rotor coil of the batteryless alternator. The exciting current regulating unit controls the operation of the power switch according to the output voltage of the batteryless alternator. The voltage detection unit detects whether the output voltage is lower than a threshold and selectively cuts off the power switch by sequentially controlling the operations of the switching circuits according to the detection result.

17 Claims, 3 Drawing Sheets

(51) Int. Cl.
*H02P 9/30* (2006.01)
*H02H 3/24* (2006.01)
*H02H 7/06* (2006.01)

(56) References Cited

U.S. PATENT DOCUMENTS 4,730,516 A * 3/1988 Kaneyuki .................. 475/153
5,231,344 A * 7/1993 Marumoto et al. ............ 322/14
5,247,808 A * 9/1993 Yoshida et al. ............. 62/228.4
6,633,153 B1 10/2003 Blackburn
7,518,254 B2 * 4/2009 Donnelly et al. ........... 290/40 C
7,924,536 B2 * 4/2011 Chen ............................ 361/20
2008/0157726 A1 * 7/2008 Chen et al. ..................... 322/28

FOREIGN PATENT DOCUMENTS

TW 200715680 4/2007
TW 200929773 A 7/2009

* cited by examiner

VOLTAGE REGULATOR, UNDER-VOLTAGE PROTECTION CIRCUIT THEREOF AND VOLTAGE REGULATION SYSTEM

BACKGROUND

1. Technical Field

The present disclosure relates to a protection circuit, in particular, to a voltage regulator, an under-voltage protection circuit thereof, and a voltage regulation system for a batteryless voltage regulation system of an air conditioning alternator.

2. Description of Related Art

Nowadays, a mobile vehicle (such as an automobile, a bus, and etc.) generally equipped with a voltage regulation system having an air conditioning alternator and a battery-powered alternator, wherein the battery-powered alternator is electrically connected to a battery. The battery-powered alternator is capable of charging the battery and powering other electrical equipment equipped on the mobile vehicle with the electrical power generated therefrom. The air conditioning alternator is mainly used for regulating the operation of the air conditioning system. Moreover, the air conditioning alternator itself does not connect to the battery and instead the air conditioning alternator is operatively driven by an engine. Specifically, the air conditioning alternator utilizes a capacitor box in replace of the battery. That is, the voltage regulation system of the air conditioning alternator is a batteryless voltage regulation system.

However, whenever the air conditioning alternator operates abnormally, for example, when air conditioning alternator operates in an under-voltage condition as a result of the power cord being worn out forming short circuit, the warning lamp of the battery would not be alerted and triggered on to warn the driver as the air conditioning alternator is not coupled to the battery. Consequently, the operation of the air conditioning system might be severely impacted or even causing the batteryless alternator to burst into flame due to overheating when the air conditioning alternator continuously running abnormally, thereby increases the chance of mobile vehicle accident.

SUMMARY

Accordingly, exemplary embodiments of the present disclosure provide a voltage regulator, an under-voltage protection circuit thereof, and a voltage regulation system, which can automatically and forcibly cut off the operation of a batteryless alternator when the batteryless alternator operates abnormally so as to prevent the occurrence of vehicle burning as the result of the batteryless alternator bursting into flame due to overheating.

An exemplary embodiment of the present disclosure provides a voltage regulator which is used for regulating electrical power generated by a rotor coil of the batteryless alternator. The voltage regulator comprises an under-voltage protection circuit and an exciting current regulating unit. The under-voltage protection circuit comprises a voltage detection unit, a plurality of switching circuits, and a power switch. The voltage detection unit is coupled to the batteryless alternator and operatively generates a first control signal responsive to an output voltage of the batteryless alternator. The switching circuits are controlled by the first control signal. The voltage detection unit operatively detects whether the output voltage is lower than a threshold, and the voltage detection unit operatively outputs the first control signal according to the detection result to sequentially control the operations of the switching circuits so as to selectively cut off the power switch.

The exciting current regulating unit is coupled to the power switch, and is used for controlling the operation (e.g., duty cycle) of the power switch according to the output voltage of the batteryless alternator so as to regulating the current flow through the rotor coil.

Another exemplary embodiment of the present disclosure provides an under-voltage protection circuit, which is coupled between a batteryless alternator and a ground. The under-voltage protection circuit comprises a voltage detection unit, a plurality of switching circuits, and a power switch. The voltage detection unit is coupled to the batteryless alternator and operatively generates a first control signal according to an output voltage of the batteryless alternator. The switching circuits are respectively coupled between a rotor coil of the batteryless alternator and the ground. The switching circuits are controlled by the first control signal. The power switch is coupled to one of the switching circuits and the rotor coil of the batteryless alternator, respectively.

According to one exemplary embodiment of the present disclosure, the switching circuits comprise a first switching circuit, a second switching circuit, and a third switching circuit. The first switching circuit is respectively coupled to the rotor coil and the ground. The first switching circuit is controlled by the first control signal. The second switching circuit is respectively coupled to the rotor coil and the ground. The second switching circuit is also coupled to the first switching circuit. The third switching circuit is coupled to the second switching circuit and the power switch.

According to one exemplary embodiment of the present disclosure, when the voltage detection unit detects that the output voltage is lower than the threshold, the voltage detection unit operatively outputs the first control signal to turn on the first switching circuit to generate a second control signal cutting off the operation of the second switching circuit while turning on the third switching circuit so as to cut off the power switch. When the voltage detection unit detects that the output voltage is higher than the threshold, the voltage detection unit operatively outputs the first control signal cutting off the first switching circuit, which causes the second switching circuit to output a third control signal disabling the operation of the third switching circuit while maintaining the power switch in operation.

Another exemplary embodiment of the present disclosure provides a voltage regulation system for a mobile vehicle. The voltage regulation system comprises at least two voltage regulation systems, wherein, one of the voltage regulation systems is a batteryless voltage regulation system (e.g., a voltage regulation system for an air conditioning alternator) having the above-mentioned voltage regulator.

To sum up, exemplary embodiments of the present disclosure provides a voltage regulator, an under-voltage protection circuit thereof, and a voltage regulation system, which can forcibly stop the operation of the batteryless alternator after a period of time through employing a plurality of timing switch circuits. Accordingly, the voltage regulator, the under-voltage protection circuit thereof, and the voltage regulation system can effectively prevent the batteryless alternator from bursting into flame due to overheating and resulting in vehicle burning tragedy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

The main spirit of the present disclosure is to provide a voltage regulator with an under-voltage protection mechanism, and the voltage regulator is adapted for a voltage regulation system for a batteryless alternator. The structure of the alternator is not the primary focus of the present disclosure, and the structure and the operation principle of the alternator are well known to those skilled in the art and thus the detail technical descriptions are hereby omitted. Instead, only the parts related to the present disclosure would be briefly described. In the present disclosure, an air conditioning (AC) alternator is merely used as an example of the batteryless alternator for illustration, and the present disclosure is not limited thereto.

Figure 1:
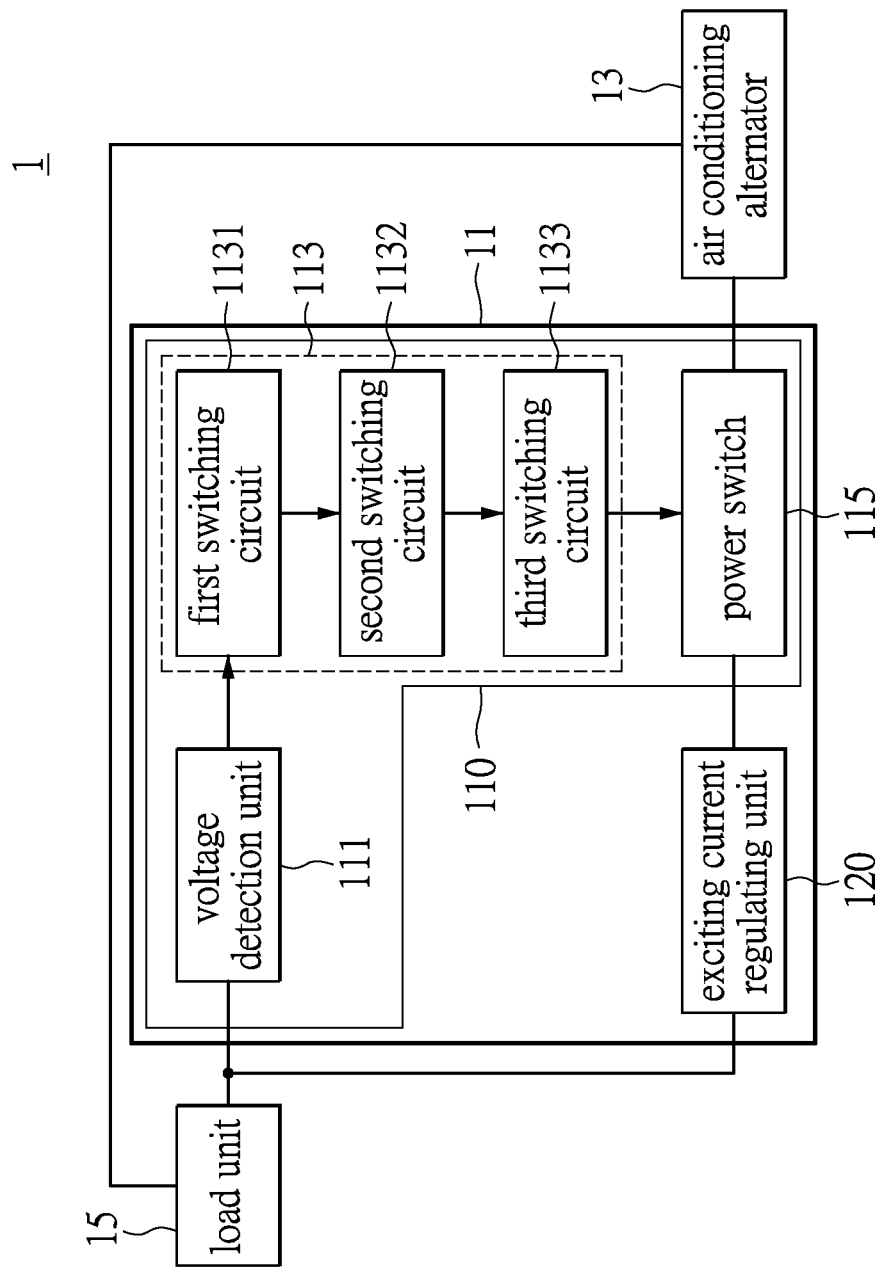
FIG. 1 is a functional block diagram of a batteryless voltage regulation system of an air conditioning alternator provided in accordance to an exemplary embodiment of the present disclosure.

FIG. 1 shows a functional block diagram illustrating a batteryless voltage regulation system of an air conditioning alternator provided in accordance to an exemplary embodiment of the present disclosure. As shown in FIG. 1, a batteryless voltage regulation system of an air conditioning alternator 1 comprises a voltage regulator 11, an air conditioning alternator 13, and a load unit 15. The voltage regulator 11 is coupled to the air conditioning alternator 13 and the load unit 15.

The voltage regulator 11 operatively regulates the power generating operation of the air conditioning alternator 13 by controlling the amount of current flow through a rotor coil (not shown) of the air conditioning alternator 13 so as to maintain the operation of the load unit 15. In addition, the voltage regulator 11 can forcibly stop the operation of the air conditioning alternator 13 when detects that the operation of the air conditioning alternator 13 is abnormal, e.g., when the output voltage cannot be successfully established or when the power generated is too low, so as to protect the air conditioning alternator 13 from being overheated.

The air conditioning alternator 13 is coupled to a battery-powered voltage regulation system through an external switch (not shown). The air conditioning alternator 13 has two operation modes: a dry-run mode and a power generating mode. When the external switch is in an open state, i.e., the external switch has not been turned on, the air conditioning alternator 13 is operatively driven in the dry run mode by an engine. Specifically, the air conditioning alternator 13 operates but does not generate electrical power. When the external switch external switch operates in a close state i.e., the external switch has been turned on, the air conditioning alternator 13 starts to generate electrical power upon excited by an exciting current supplied by a battery-powered alternator. The air conditioning alternator 13 can generate electrical power by an external excitation method using the exciting current provided externally.

In the instant embodiment, the load unit 15 comprises a capacitive element (not shown in FIG. 1) and a load (not shown in FIG. 1), wherein the capacitive element is connected to the load in parallel. The capacitive element can be configured to provide the exciting current to the air conditioning alternator 13 through the voltage regulator 11 after the air conditioning alternator 13 starts to generate electrical power. In addition, the capacitive element can be further used to operatively stabilize and filter an output voltage generated by the air conditioning alternator 13. That is, the output voltage generated by the air conditioning alternator 13 can be filtered and stabilized by the capacitive element and supply to the load. The load is an electrical component for consuming power operatively generated by the air conditioning alternator 13. The load can include but not limited to a fan or air conditioning equipment.

The voltage regulator 11 comprises an under-voltage protection circuit 110 and an exciting current regulating unit 120. The under-voltage protection circuit 110 is coupled to the exciting current regulating unit 120.

The under-voltage protection circuit 110 further comprises a voltage detection unit 111, a control unit 113, and a power switch 115. The voltage detection unit 111 is coupled to the load unit 15 and the control unit 113. The control unit 113 is coupled to the power switch 115. The power switch 115 is coupled between the exciting current regulating unit 120 and the air conditioning alternator 13. The power switch 115 and the rotor coil (not shown) of the air conditioning alternator 13 are coupled to each other in series.

The control unit 113 further comprises a first switching circuit 1131, a second switching circuit 1132, and a third switching circuit 1133. The first switching circuit 1131 is coupled between the voltage detection unit 111 and the second switching circuit 1132. The third switching circuit 1133 is coupled between the second switching circuit 1132 and the power switch 115.

The voltage detection unit 111 is used to operatively detect whether the output voltage of the air conditioning alternator 13 is lower than a threshold, and controls the operation of the control unit 113 according to the detection result. The voltage detection unit 111 outputs a first control signal responsive to the detection result to sequentially control the operations of the first switching circuit 1131, the second switching circuit 1132, and the third switching circuit 1133 so as to selectively cut off the power switch 115.

The exciting current regulating unit 120 can control the on/off operation of the power switch 115 according to the output voltage of the air conditioning alternator 13 detected during the normal power generating operation of the air conditioning alternator 13. In other words, the exciting current regulating unit 120 operatively regulates the current flowing through the air conditioning alternator 13 through controlling the on/off operation of the power switch in an operation cycle thereof (i.e., duty cycle of the power switch 115) thereby control the amount of power generated by the air conditioning alternator 13.

When the air conditioning alternator 13 starts to generate electrical power while the exciting current regulating unit 120 turns on the power switch 115 (i.e., the external switch is turned on), the voltage detection unit 111 operatively outputs the first control signal turning on the first switching circuit 1131 upon detecting that the output voltage of the air conditioning alternator 13 is lower than the threshold indicating that the air conditioning alternator 13 fails to establish voltage. The first switching circuit 1131 further operatively outputs a second control signal cutting off the operation of the second switching circuit 1132 to turn on the third switching circuit 1133 cutting off the power switch 115. Accordingly, the control unit 113 can forcibly cut off the power switch 115 and the exciting current path to stop the operation of the air conditioning alternator 13.

Additionally, during the normal power generating operation of the air conditioning alternator 13, the exciting current regulating unit 120 can correspondingly regulate the on/off operation of the power switch 115 responsive to the output voltage of the air conditioning alternator 13.

Specifically, during the normal power generating operation of the air conditioning alternator 13, the exciting current regulating unit 120 increases the cut-off duration of the power switch 115 in an operation cycle to reduce the current flowing through the rotor coil upon detecting that the output voltage of the air conditioning alternator 13 is too high so as to reduce the output voltage of the air conditioning alternator 13; the exciting current regulating unit 120 increases the on duration of the power switch 115 in an operation cycle to increase the current flow through the rotor coil upon detecting that the output voltage of the air conditioning alternator 13 is too low so as to increase the output voltage of the air conditioning alternator 13.

Taking a 28-volt batteryless voltage regulation system of an air conditioning alternator as an example, the threshold may for example be 22 volts (V). When the voltage detection unit 111 detects that the output voltage of the air conditioning alternator 13 is lower than 22V after successfully conduct power generating operation, the voltage detection unit 111 operatively outputs the first control signal (e.g., a high voltage level signal) to sequentially control the on/off operations of the first switching circuit 1131, second switching circuit 1132, and the third switching circuit 1133 of the control unit 113 to cause the third switching circuit 1133 to forcibly cut off the power switch 115.

On the contrary, when the voltage detection unit 111 detects that the output voltage of the air conditioning alternator 13 is higher than 22V, the voltage detection unit 111 operatively outputs the first control signal (e.g., a low voltage level signal) to sequentially control the on/off operations of the first switching circuit 1131, the second switching circuit 1132, and the third switching circuit 1133 of the control unit 113 so that the third switching circuit 1133 has no impacts on the operation of the power switch 115. At the same time, the exciting current regulating unit 120 correspondingly controls the operation of the power switch 115 according to the output voltage of the air conditioning alternator 13.

Hence, the voltage regulator 11 of the present disclosure can actively detect the output voltage of the air conditioning alternator 13 and forcibly stop the operation of the air conditioning alternator 13 upon determining that the operation of the air conditioning alternator 13 is abnormal, e.g., when short circuit formed as a result of the power cord being worn out. Accordingly, the voltage regulator 11 can effectively protect the air conditioning alternator 13 and prevent the occurrence of vehicle burning as the result of having the air conditioning alternator 13 bursting into flame due to overheating.

A detailed implementation and the operation associated with the voltage regulator of a batteryless alternator are further illustrated in the following description. Please refer to FIG. 2 in conjunction with FIG. 1, which shows a detail schematic diagram of a voltage regulator provided in accordance to an exemplary embodiment of the present disclosure. The voltage regulator 11 is, for example, a five-terminal voltage regulator. The voltage regulator 11 has an excitation terminal EXC, a positive field terminal F+, a negative field terminal F−, a power terminal B+, and a ground terminal GND. The power terminal B+ is coupled to the load unit 15. The excitation terminal EXC is coupled to an external switch SW1 through a diode D2 to receive an input voltage V+ and an exciting current after the external switch SW1 turns on. The positive field excitation terminal F+ is coupled to a first terminal of a rotor coil 131 of an air conditioning alternator (not shown in FIG. 2). The negative field excitation terminal F− is coupled to a second terminal of the rotor coil 131.

Figure 2:
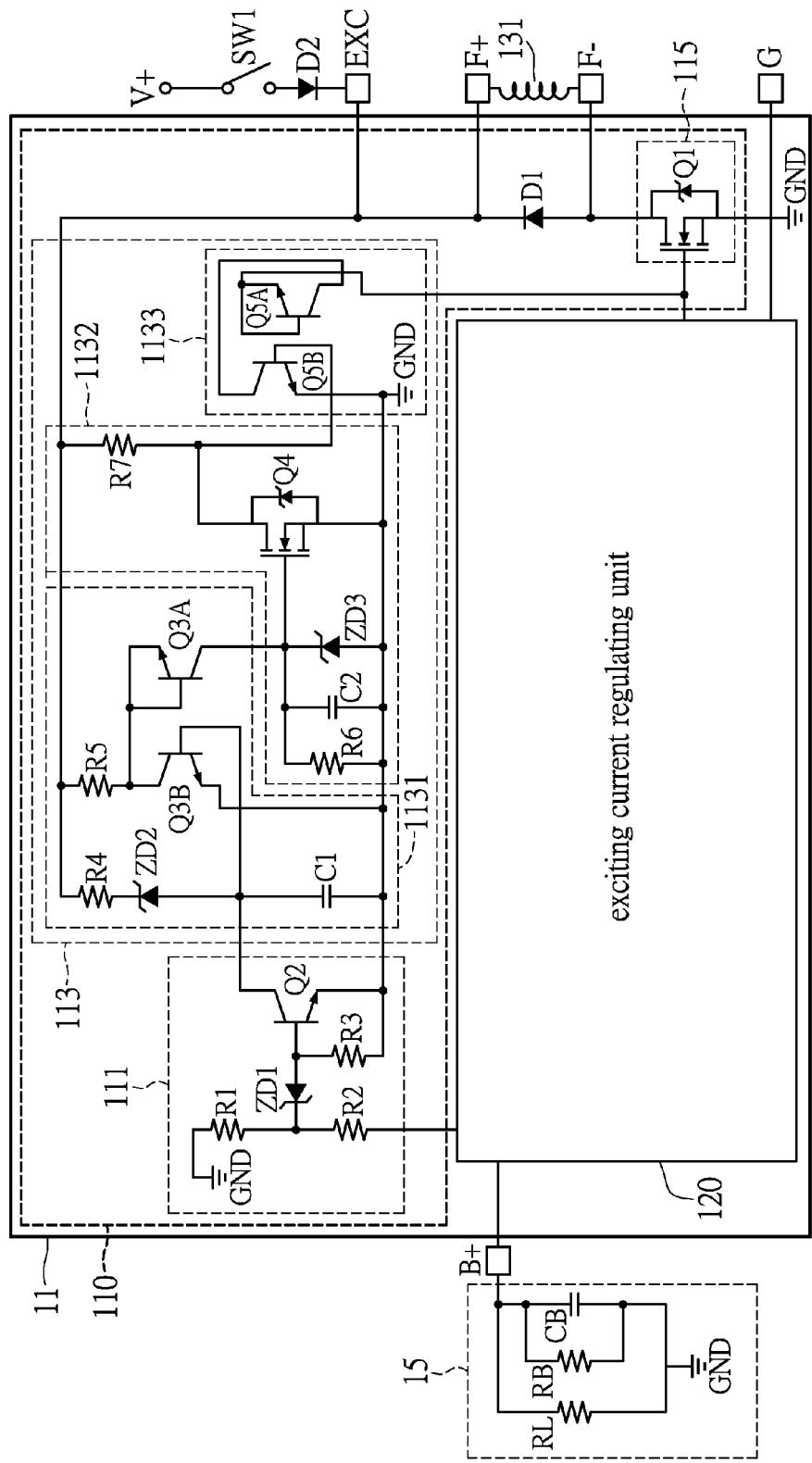
FIG. 2 is a detail schematic diagram of a voltage regulator provided in accordance to an exemplary embodiment of the present disclosure.

A first terminal of the external switch SW1 is coupled to a battery (not shown in FIG. 2) in a voltage regulation system of a battery-powered alternator (not shown in FIG. 2). A second terminal of the external switch SW1 is coupled to an anode of the diode D2. A cathode of the diode D2 is coupled to the excitation terminal EXC. Accordingly, when the external switch SW1 turns on, the diode D2 can direct the exciting current from the excitation terminal EXC through the positive field terminal F+ to excite the rotor coil 131 so as to generate magnetic field driving the air conditioning alternator 13 to start generate electrical power.

The load unit 15 comprises a load RL, a resistor RB, and a capacitor CB. The load RL represents an electronic component such as a fan or air conditioning equipment which consumes the power generated by the air conditioning alternator. In practice, the load RL exists only when the external switch SW1 turns on. A first terminal of the capacitor CB is coupled to a power terminal B+ of the voltage regulator 11 while a second terminal of the capacitor CB is coupled to the ground terminal GND. The resistor RB and the capacitor CB are connected in parallel, and the resistor RB is disposed to provide a discharging path for the capacitor CB in no load condition (e.g., the load RL is zero). The load RL and the capacitor CB are also connected in parallel. The parallel circuit of the capacitor CB and the resistor RB is capable of filtering and stabilizing the output voltage of the air conditioning alternator 13.

The power switch 115 of the under-voltage protection circuit 110 has an input terminal, an output terminal, and a control terminal. The input terminal of the power switch 115 is coupled to an anode of a flywheel diode D1. The output terminal of the power switch 115 is coupled to the ground terminal GND. The control terminal of the power switch 115 is coupled to the exciting current regulating unit 120 and the third switching circuit 1133, respectively. In the instant embodiment, the power switch 115 is implemented by a power transistor Q1. Particularly, a gate of the power transistor Q1 is coupled to the exciting current regulating unit 120 and the third switching circuit 1133, a source thereof is coupled to the ground terminal GND, and a drain thereof is coupled to the anode of the flywheel diode D1. Accordingly, the exciting current regulating unit 120 can control the on/off operation of the power switch 115 in an operation cycle through adjusting the gate voltage of the power transistor Q1 so as to control the current flow through the rotor coil 131.

The voltage detection unit 111 comprises a voltage division circuit, a voltage detection element, and a first switch. The voltage division circuit includes resistors R1, R2; the voltage detection element includes a zener diode ZD1; the first switch includes a transistor Q2. The first switch further includes a resistor R3, which is coupled between a base and an emitter of the transistor Q2.

A first terminal of the resistor R1 is coupled to the ground terminal GND and a second terminal of the resistor R1 is coupled to a first terminal of resistor R2. A second terminal of the resistor R2 is coupled to the power terminal B+ and the exciting current regulating unit 120. A cathode of the zener diode ZD1 is coupled to a junction formed between the resistor R1 and the resistor R2 and an anode of the zener diode ZD1 is coupled to the base of the transistor Q2. A collector of the transistor Q2 is coupled to the first switching circuit 1131 and the emitter of the transistor Q2 is coupled to the ground terminal GND.

The voltage division circuit is used for capturing the voltage at the power terminal B+ (which corresponds to the output voltage of the air conditioning alternator) for the zener diode ZD1 to determine whether the voltage at the power terminal B+ is lower than a threshold. When the voltage at the power terminal B+ is higher than the threshold, the zener diode ZD1 conducts causing the transistor Q2 to output the first control signal from the collector thereof cutting off the first switching circuit 1131 of the control unit 113. Conversely, when the voltage at the power terminal B+ is lower than the threshold, the zener diode ZD1 operates in a cut-off state such that the transistor Q2 is in the cut off mode and outputs the first control signal from the collector thereof turning on the first switching circuit 1131 of the control unit 113.

It is worth to note that the resistor R1, resistor R2, and the zener diode ZD1 of the instant embodiment can be selected and designed according to the threshold desired.

The first switching circuit 1131 includes resistors R4, R5, a zener diode ZD2, a capacitor C1, a second switch, and a third switch. The second switch further includes a transistor Q3A, and the third switch includes a transistor Q3B. The second switching circuit 1132 includes resistors R6, R7, a capacitor C2, a zener diode ZD2, and a forth switch, wherein the forth switch includes a power transistor Q4. The third switching circuit 1133 includes a fifth switch and a sixth switch, wherein the fifth switch includes a transistor Q5A and the sixth switch includes a transistor Q5B.

A first terminal of the resistor R4 is coupled to the excitation terminal EXC and a second terminal of the resistor R4 is coupled to a cathode of the zener diode ZD2. An anode of the zener diode ZD2 is coupled to a first terminal of the capacitor C1. A second terminal of the capacitor C2 is coupled to the ground through the ground terminal GND. In other words, the resistor R4, the zener diode ZD2, and the capacitor C1 are serially coupled between the excitation terminal EXC and the ground terminal GND. A junction between the anode of the zener diode ZD2 and the first terminal of the capacitor C1 is coupled to the collector of the transistor Q2 and a base of the transistor Q3B.

The zener diode ZD2 is used to prevent the transistor Q3B from being false alarmed by the minute voltage generated by the air conditioning alternator 13 during the initial dry run mode. Further, the resistor R4 and the capacitor C1 are serially coupled to each other to form a circuit for delaying the turn-on time of the transistor Q3B i.e., causes the transistor Q3B to be turned on a period of time after receiving the first control signal for enablement.

A first terminal of the resistor R5 is coupled to the excitation terminal EXC. The two terminals of the resistor R5 are respectively coupled to an emitter of the transistor Q3A and a collector of the transistor Q3B. The resistor R5 is serially-connected between the excitation terminal EXC and the collector of the transistor Q3B so as to control the current flowing through the transistor Q3B from the excitation terminal EXC. The emitter and a base of the transistor Q3A are electrically connected to each other. The emitter and a base of the transistor Q3A are further coupled to the collector of the transistor Q3B. The emitter of the transistor Q3B is coupled to the ground terminal GND. A collector of the transistor Q3A is coupled to a gate of the power transistor Q4 in the second switching circuit 1132 to operatively output the second control signal controlling the operation of the power transistor Q4. The transistor Q3A are configured in a diode connection and can operatively output the second control signal which is generated by the transistor Q3B of the first switching circuit 1131 according to the first control signal, to the power transistor Q4 through the emitter and the collector of the transistor Q3A. In a practical operation, the transistor Q3A operatively pulls up the gate voltage of the power transistor Q4 to turn on the power transistor Q4 when the transistor Q3B cuts off. On the contrary, the transistor Q3A stops charging the capacitor C2 when the transistor Q3B turns on, and the power transistor Q4 turns off when the gate voltage becomes lower than a predetermined value.

A drain of the power transistor Q4 is coupled to the excitation terminal EXC through the resistor R7. A source of the power transistor Q4 is coupled to the ground terminal GND. The gate of the power transistor Q4 as previously described is controlled by the second control signal, which is outputted from the collector of the transistor Q3A. A cathode of the zener diode ZD3 is coupled to the gate of the power transistor Q4 and an anode of the zener diode ZD3 is coupled to the ground terminal GND. The zener diode ZD3 is coupled between the gate and the source of the power transistor Q4. The zener diode ZD3 is used for stabilizing the voltage across the gate and the source of the power transistor Q4 when the power transistor Q4 turns on. A first terminal of the resistor R6 is coupled to the gate of the power transistor Q4 and a second terminal of the resistor R6 is coupled to the ground terminal GND. A first terminal of the capacitor C2 is coupled to the gate of the power transistor Q4 and a second terminal of the capacitor C2 is coupled to the ground terminal GND. The resistor R6 and the capacitor C2 are coupled to each other in parallel to form a discharge loop and extend the conduction duration of the power transistor Q4. The resistor R6 and the capacitor C2 cuts off the power transistor Q4 a period of time after the second control signal cuts off the power transistor Q4. The parallel circuit of the resistor R6 and the capacitor C2 is further coupled in parallel with the zener diode ZD3.

A base and an emitter of the transistor Q5A are coupled to each other. The base and the emitter of the transistor Q5A are further coupled to the gate of the power transistor Q1 (i.e., the control terminal of the power switch 115). A collector of the transistor Q5A is coupled to a collector of the transistor Q5B. An emitter of the transistor Q5B is coupled to the ground terminal GND. A base of the transistor Q5B is coupled to the drain of the power transistor Q4, and the transistor Q5B is controlled by the power transistor Q4. Accordingly, the second switching circuit 1132 can output a third control signal through the power transistor Q4 to control the operation of the third switching circuit 1133 i.e., selectively turning on or cutting off the operation of the transistor Q5B. The transistor Q5A can further selectively cut off the power transistor Q1 responsive to the operation of the transistor Q5B.

In the instant embodiment, at the instant that the external switch SW1 is closed to turn on the air conditioning alternator, the power transistor Q4 turns on before the transistor Q3B to disable the operation of the transistor Q5B thereby prevent the power transistor Q1 from being turned off by the transistors Q5A and Q5B due to a minute voltage detected at the power terminal B+ when the air conditioning alternator 13 initially operates in the dry run mode or just start to generate electrical power.

In the instant embodiment, the charging time of the capacitor C1 can be configured by the capacitance of the capacitor C1 and the resistance of the resistor R4. As soon as the capacitor C1 is fully charged, the transistor Q3B turns on and outputs a low voltage level second control signal to the gate of the power transistor Q4 pulling down the gate voltage of the power transistor Q4.

Moreover, when the capacitor C2 is fully discharged through the resistor R6, the power transistor Q4 cuts off. The discharging time of the capacitor C2 can be adjusted through design and configure the capacitance of the capacitor C2 and the resistance of the resistor R6. The third control signal is outputted from the drain of the power transistor Q4 after the power transistor Q4 cuts off to turn on the transistor Q5B causing the power transistor Q1 to cut off and forcibly shut down the air conditioning alternator 13. In short, when the air conditioning alternator 13 fails to start generating power within a predetermined time, e.g. within 3 to 4 seconds, the voltage regulator 11 cuts off the second switching circuit 1132 causing the third switching circuit 1133 to turn on to forcibly cut off the power transistor Q1 and forcibly stop the operation of the air conditioning alternator. In other words, when the air conditioning alternator 13 starts to generate electrical power, and the time that the voltage at the power terminal B+ being lower than the threshold is less than the predetermined time, the air conditioning alternator 13 can still operate normally. On the contrary, if the time that the voltage at the power source terminal B+ being lower than the threshold exceeds the predetermined time, the voltage regulator 11 forcibly cut off the power transistor Q1 to stop the operation of the air conditioning alternator 13 until the external switch SW1 has been switched on again to supply power.

The predetermined time can be configured through properly designing the charging time of the capacitor C1 and the discharging time of the capacitor C2. The power transistor Q4 can be implemented by NMOS power transistor. The transistors Q1, Q2, Q3A, Q3B, Q5A, and Q5B can be implemented by NPN bipolar transistors, and the present disclosure is not limited thereto. Those skilled in the art of the present disclosure can freely select suitable alternative elements of various types according to the actual operational requirement.

Moreover, the voltage detection unit 111 can be implemented by a comparator. For example, a first input terminal of the comparator (such as a non-inverting terminal) is coupled to the power terminal B+, and a second input terminal of the comparator (such as an inverting terminal) is coupled to a reference voltage V_REF. An output terminal of the comparator is coupled to a base of the transistor Q2. Accordingly, the comparator can correspondingly output the first control signal according to the comparing result between the voltage at the power terminal B+ and the reference voltage V_REF to control the operation of the first switching circuit 1131.

The present disclosure furthers provides an exemplary embodiment of applying a voltage regulator to a voltage regulation system of a mobile vehicle. Please refer to FIG. 3, which illustrates a voltage regulation system 2 of a mobile vehicle at least comprises two voltage regulation systems. In which, one is a battery-powered voltage regulation system, and the other is a batteryless voltage regulation system. The batteryless voltage regulation system is a voltage regulation system of a batteryless air conditioning alternator, which comprises a voltage regulator 21, an air conditioning alternator 23, and a load unit 25. The battery-powered voltage regulation system comprises an alternator 27 and a battery 29, wherein the alternator 27 is coupled to and powered by the battery 29. The air conditioning alternator 23 comprises a rotor coil 231, a stator coil 233, and a rectification unit 235, wherein the stator coil 233 is coupled to the rectification unit 235. The load unit 25 comprises a parallel circuit consisting of a capacitor CB, a resistor RB, and a load RL.

The excitation terminal EXC of the voltage regulator 21 is coupled to the battery 29 through the diode D2 and the external SW1 to receive the exciting current supplied by the battery 29. The excitation terminal EXC is coupled to the air conditioning alternator 23. The positive field terminal F+ is coupled to a first terminal of the rotor coil 231. The negative field terminal F− is coupled to a second terminal of the rotor coil 231. The power terminal B+ is coupled to the load unit 25 and the air conditioning alternator 23. The ground terminal GND is coupled to the ground. The voltage regulator 21 can be the aforementioned five-terminal voltage regulator. The load RL may include but not limited to a fan or air conditioning equipment.

Figure 3:
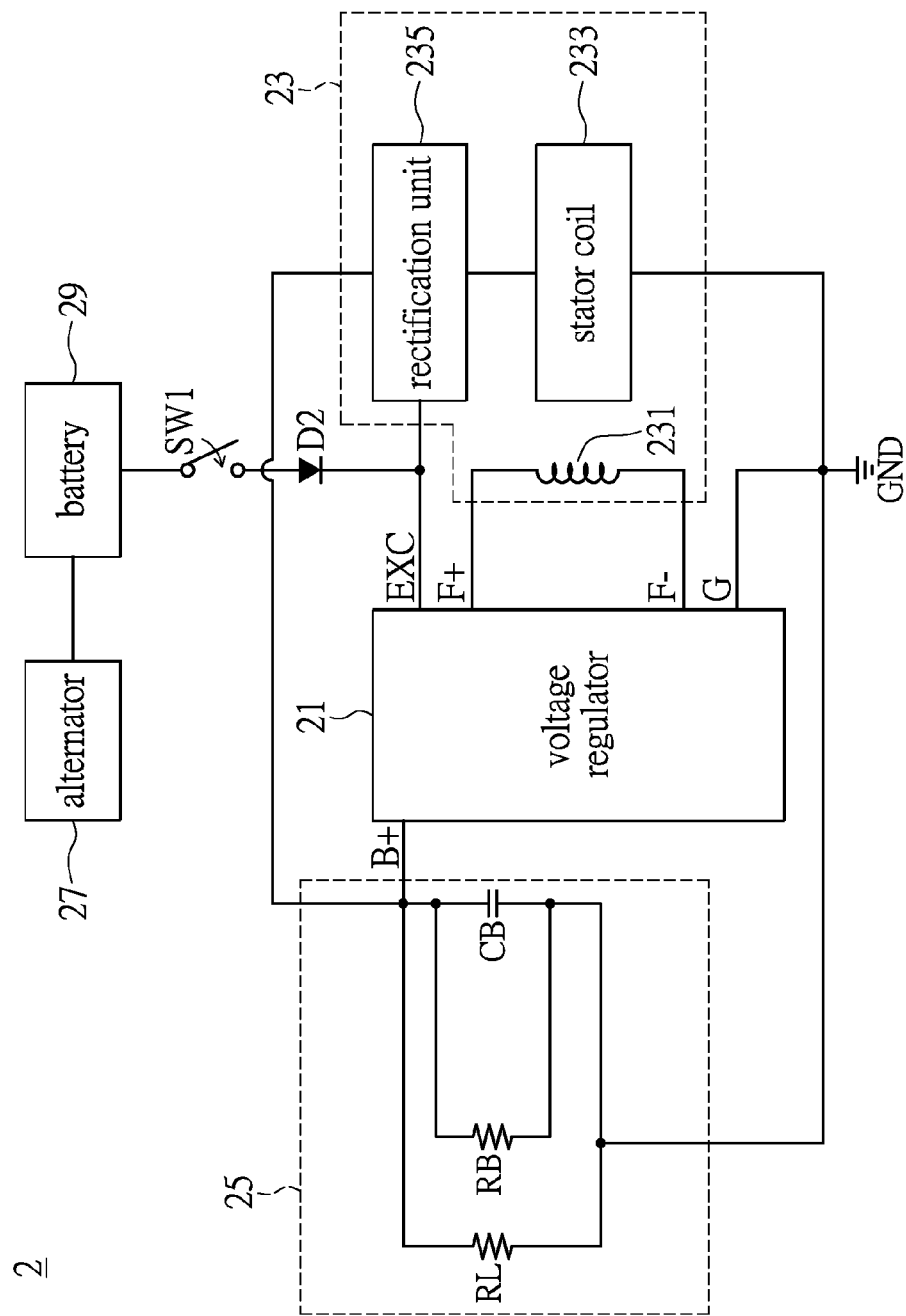
FIG. 3 is a functional block diagram of a voltage regulation system for a mobile vehicle provided in accordance to an exemplary embodiment of the present disclosure.

As shown in FIG. 3, the rotor coil 231 receives the exciting current supplied by the battery 29 through the excitation terminal EXC of the voltage regulator 21 when the external switch SW1 turns on so as to drive the air conditioning alternator 23 to generate electrical power. The voltage regulator 21 further regulates the output voltage of the air conditioning alternator 23.

When the voltage regulator 21 determines that the air conditioning alternator 23 can successfully generate electrical power, the voltage regulator 21 control the current flow through the stator coil 233 through regulating the exciting current flowing through the excitation terminal EXC, the positive field terminal F+, the rotor coil 231, and negative field terminal F−. At the same time, the voltage regulator 21 regulates the output voltage of the air conditioning alternator 23 and supply to the load RL, When the voltage regulator 21 determines that the air conditioning alternator 23 operates abnormally e.g., fails to generate electrical power, the voltage regulator 21 forcibly cut off the exciting path formed by the excitation terminal EXC, the positive field terminal F+, the rotor coil 231, and the negative field terminal F− so as to stop the operation of the air conditioning alternator 23. Accordingly, the phenomenon of the air conditioning alternator 23 burst into flame due to overheating and resulting in vehicle burning tragedy can be effectively avoided.

In another exemplary embodiment, the voltage regulator 21 can be integrated into a chip, and the chip has at least five terminals, i.e., the power terminal B+, the excitation terminal EXC, the positive field terminal F+, the negative field terminal F−, and the ground terminal GND. In the instant application, the output voltage detecting method and the associated operation controlling method for the air conditioning alternator 23 may be implemented through firmware writing method and/or a hardware circuit designing method, however, the present disclosure is not limited thereto.

The above-mentioned descriptions represent merely the exemplary embodiment of the present disclosure, without any intention to limit the scope of the present disclosure thereto.

What is claimed is:

1. A voltage regulator, configured for regulating the electrical power generated by a rotor coil of a batteryless alternator, comprising:
    an under-voltage protection circuit coupled between the batteryless alternator and a ground, the under-voltage protection circuit comprising:
        a voltage detection unit coupled to the batteryless alternator, operative to generate a first control signal according to an output voltage of the batteryless alternator;
        a plurality of switching circuits respectively coupled between the rotor coil of the batteryless alternator and the ground, the switching circuits being controlled by the first control signal; and a power switch, respectively coupled to one of the switching circuits and the rotor coil of the batteryless alternator; and an exciting current regulating unit coupled to the power switch, operatively controlling the operation of the power switch according to the output voltage to regulate the current flow through the rotor coil;

wherein the voltage detection unit detects whether the output voltage is lower than a threshold, and the voltage detection unit outputs the first control signal according to the detection result to sequentially control the operations of the switching circuits so as to selectively cut off the power switch;

wherein when the voltage detection unit detects that the output voltage is lower than the threshold while the exciting current regulating unit turns on the power switch, the voltage detection unit sequentially controls the switching circuits cutting off the power switch.

2. The voltage regulator according to claim 1, wherein the switching circuits further comprise:

a first switching circuit respectively coupled to the rotor coil and the ground, the first switching circuit being controlled by the first control signal;

a second switching circuit respectively coupled to the rotor coil and the ground, the second switching circuit being coupled to the first switching circuit; and a third switching circuit coupled to the ground, wherein the third switching circuit is further coupled between the second switching circuit and the power switch; wherein when the voltage detection unit detects that the output voltage is lower than the threshold, the voltage detection unit operatively outputs the first control signal to turn on the first switching circuit to generate a second control signal cutting off the operation of the second switching circuit while turning on the third switching circuit so as to cut off the power switch.

3. The voltage regulator according to claim 2, wherein when the voltage detection unit detects that the output voltage is higher than the threshold, the voltage detection unit operatively outputs the first control signal cutting off the first switching circuit causing the second switching circuit to output a third control signal disabling the third switching circuit while causing the exciting current regulating unit to control the operation of the power switch according to the output voltage.

4. The voltage regulator according to claim 3, wherein when the first switching circuit operatively turns on and outputs the second control signal turning off the second switching circuit, the second switching circuit cuts off after a predetermined time.

5. The voltage regulator according to claim 2, wherein the voltage detection unit comprises:

a voltage division circuit, comprising:

a first resistive element having the first terminal thereof coupled to the ground;

a second resistive element having the first terminal thereof coupled to the second terminal of the first resistive element, and the second terminal thereof coupled to the batteryless alternator;

a voltage detection element having the first terminal thereof coupled to the first terminal of the second resistive element; and a first switch having a first input terminal, a first output terminal, and a first control terminal, the first output terminal being coupled to the ground, the first control terminal being coupled to the second terminal of the voltage detection element;

wherein the voltage detection element operatively controls the first switch to output the first control signal at the first input terminal according to the output voltage.

6. The voltage regulator according to claim 5, wherein the first switching circuit comprises:

a second switch having a second input terminal, a second output terminal, and a second control terminal, the second input terminal being coupled to the rotor coil while the second control terminal being coupled to the second input terminal; and a third switch having a third input terminal, a third output terminal, and a third control terminal, the third input terminal being coupled to the rotor coil, the third output terminal being coupled to the ground, and the third control terminal being coupled to the first input terminal for causing the second switch to generate the second control signal at the second output terminal according to the first control signal.

7. The voltage regulator according to claim 6, wherein the second switching circuit comprises:

a forth switch having a forth input terminal, a forth output terminal, and a forth control terminal, the forth input terminal being coupled to the rotor coil, the forth output terminal being coupled to the ground, the forth control terminal being coupled to the second output terminal, operatively generating the third control signal at the forth input terminal according to the second control signal.

8. The voltage regulator according to claim 1, wherein the power switch and the rotor coil are connected in series.

9. The voltage regulator according to claim 1, wherein the voltage detection unit is coupled to a load unit, and the load unit comprises:

a load;

a first capacitive element, a first terminal of the first capacitive element coupled to the batteryless alternator and the voltage detection unit, a second terminal of the first capacitive element coupled to the ground, and the first capacitive element being coupled in parallel with the load; and a first bleeding element coupled in parallel with the first capacitive element.

10. An under-voltage protection circuit coupled between a batteryless alternator and a ground, the under-voltage protection circuit comprising:

a voltage detection unit coupled to the batteryless alternator, operative to generate a first control signal according to an output voltage of the batteryless alternator;

a plurality of switching circuits respectively coupled between a rotor coil of the batteryless alternator and the ground, the switching circuits being controlled by the first control signal; and a power switch respectively coupled to one of the switching circuits and the rotor coil of the batteryless alternator;

wherein the voltage detection unit detects whether the output voltage is lower than a threshold, and the voltage detection unit outputs the first control signal according to the detection result to sequentially control the operations of the switching circuits so as to selectively cut off the power switch;

wherein the switching circuits comprise:

a first switching circuit respectively coupled to the rotor coil of the of the air conditioning alternator and the ground, the first switching circuit being controlled by the first control signal;

a second switching circuit respectively coupled to the rotor coil and the ground, the second switching circuit being also coupled to the first switching circuit; and a third switching circuit coupled between the second switching circuit and the power switch;

wherein when the voltage detection unit detects that the output voltage is lower than the threshold, the voltage detection unit operatively outputs the first control signal turning on the first switching circuit and generating a second control signal to cut off the operation of the second switching circuit while turning on the third switching circuit so as to cut off the power switch.

11. The under-voltage protection circuit according to claim 10, wherein when the voltage detection unit detects that the output voltage is higher than the threshold, the voltage detection unit operatively outputs the first control signal cutting off the first switching circuit causing the second switching circuit to output a third control signal disabling the third switching circuit while maintaining the power switch in operation.

12. The under-voltage protection circuit according to claim 10, wherein when the first switching circuit is turned on and outputs the second control signal turning off the second switching circuit, the second switching circuit cuts off after a predetermined time.

13. The under-voltage protection circuit according to claim 10, wherein the power switch and the rotor coil are connected in series.

14. A voltage regulation system, adapted for a mobile vehicle, the voltage regulation system comprising:

a battery-powered voltage regulation system, powered by a battery; and a batteryless voltage regulation system, comprising:

a batteryless alternator comprising a rotor coil, the batteryless alternator being coupled to the battery-powered voltage regulation system through an external switch;

a load unit; and a voltage regulator, configured for regulating the electrical generated by the rotor coil, the voltage regulator comprising:

an under-voltage protection circuit coupled between the batteryless alternator and a ground, the under-voltage protection circuit comprising:

a voltage detection unit coupled to the batteryless alternator and the load unit, operative to generate a first control signal according to an output voltage of the batteryless alternator;

a plurality of switching circuits respectively coupled between the rotor coil of the batteryless alternator and the ground, the switching circuits being controlled by the first control signal; and a power switch respectively coupled to one of the switching circuits and the rotor coil; and an exciting current regulating unit coupled to the power switch, operatively controlling the operation of the power switch according to the output voltage to regulate the current flow through the rotor coil;

wherein the voltage detection unit detects whether the output voltage is lower than a threshold, and the voltage detection unit outputs the first control signal responsive to the detection result to sequentially control the operations of the switching circuits so as to selectively cut off the power switch;

wherein when the voltage detection unit detects that the output voltage is lower than the threshold whole the exciting current regulating unit turns on the power switch, the voltage detection unit sequentially controls the switching circuits cutting off the power switch.

15. The voltage regulation system according to claim 14, wherein the power switch and the rotor coil are connected in series.

16. The voltage regulation system according to claim 14, wherein the load unit comprises:

a load;

a first capacitive element, a first terminal of the first capacitive element coupled to the batteryless alternator and the voltage detection unit, a second terminal of the first capacitive element coupled to the ground, and the first capacitive element being coupled in parallel with the load; and a first bleeding element coupled in parallel with the first capacitive element.

17. The voltage regulation system according to claim 14, wherein the voltage regulator further comprises a flywheel diode, coupled in parallel with the rotor coil.

* * * * *